United States Patent [19]
Daft et al.

[11] Patent Number: 5,445,156
[45] Date of Patent: Aug. 29, 1995

[54] METHOD FOR ADAPTIVELY FILTERING DOPPLER SIGNALS USING A COMPLEX TIME DOMAIN FILTER

[75] Inventors: Christopher M. W. Daft, Schenectady, N.Y.; Anne L. Hall, New Berlin; Sharbel E. Noujaim, Wauwatosa, both of Wis.; Lewis J. Thomas, Schenectady; Kenneth B. Welles, II, Scotia, both of N.Y.

[73] Assignee: General Electric Company, Schenectady, N.Y.

[21] Appl. No.: 333,184

[22] Filed: Nov. 2, 1994

[51] Int. Cl.⁶ .............................................. A61B 8/00
[52] U.S. Cl. .............................................. 128/661.08
[58] Field of Search ............... 128/660.05, 661.01, 128/661.08, 661.09, 661.1, 662.06; 73/861.25; 364/413.25

[56] References Cited

U.S. PATENT DOCUMENTS

| | | | |
|---|---|---|---|
| 5,186,177 | 2/1993 | O'Donnell et al. | 128/662.06 |
| 5,349,524 | 9/1994 | Daft et al. | 364/413.25 |
| 5,357,965 | 10/1994 | Hall et al. | 128/661.08 |

OTHER PUBLICATIONS

Kasai et al., "Real-Time Two-Dimensional Blood Flow Imaging Using an Autocorrelation Technique", IEEE Transactions on Sonics and Ultrasonics, vol. SU-32, No. 3, May 1985, pp. 458-463.

*Primary Examiner*—George Manuel
*Attorney, Agent, or Firm*—Marvin Snyder

[57] ABSTRACT

A time domain technique for implementing an adaptive wall filter improves imaging of low-velocity blood flow by removing signals associated with slowly moving tissue. Adaptive wall filtering is performed by estimating wall velocity and bandwidth, and then filtering the basebanded data with a complex time domain notch filter. The wall velocity estimate determines the center frequency of a wall signal while the wall variance estimate determines the wall signal bandwidth. The complex filter coefficients selected are those which will center the complex notch filter on the wall center frequency, and which will set the filter cutoff frequencies (measured from this center frequency) to match the wall signal bandwidth.

23 Claims, 5 Drawing Sheets

METHOD FOR ADAPTIVELY FILTERING DOPPLER SIGNALS USING A COMPLEX TIME DOMAIN FILTER

FIELD OF THE INVENTION

This invention relates to color flow Doppler imaging of fluid flow fields and, more particularly, to a method and apparatus for imaging blood flow in a living body by detecting Doppler shifting of vibratory energy (which may be in the form of sonic, ultrasonic or electromagnetic radiation, but herein described, for exemplary purposes, as being ultrasonic) echoes reflected from the flowing blood.

BACKGROUND OF THE INVENTION

Measurement of blood flow in the heart and blood vessels by using the Doppler effect is well known. While amplitude of the reflected waves is employed to produce black and white images of the tissues, the frequency shift of the reflected waves may be used to measure velocity of reflecting scatterers in tissue or blood. Color flow images are produced by superimposing a color image of the velocity of moving material, such as blood, over the black and white anatomical image. The measured velocity of flow at each pixel determines its color.

A major difficulty in making Doppler effect measurements of ultrasonic waves reflected from blood is that the received echo signal typically contains a large component produced by stationary or slowly moving tissues, whereas blood reflects ultrasound very weakly. The stationary tissues do not produce a frequency shift in the reflected waves and these components can easily be filtered out without affecting the flow measurement. However, the reflections produced by the moving tissue due to cardiac or respiratory motion are frequency shifted and may completely overwhelm signals from slowly flowing blood.

In standard color flow processing, a high pass filter known as a wall filter is applied to the data before a color flow estimate is made. This filter removes signal components produced by tissue surrounding the blood flow of interest. If these signal components are not removed, the resulting velocity estimate will be a combination of the velocities of the blood flow and the surrounding tissue. The backscatter component from tissue is many times larger than that from blood, so the velocity estimate will most likely be more representative of the tissue, rather than the blood flow. In order to measure the flow velocity, the tissue signal must be filtered out.

Most commonly, color flow processors accept the large signal returning from the surrounding tissue as being static, based on an assumption that the tissue is not moving. If this is the case, the in-phase and quadrature I and Q data can be filtered separately with simple real filters which remove the DC component and very low frequencies. The cutoff frequency of these high pass filters can be varied for a given application by changing the filter coefficients.

The assumption of static tissue is generally a good one for radiology applications, except in the abdomen, where residual respiratory and cardiac motion cause some amount of tissue motion. In addition, motion of the hand held transducer will also produce an appearance of tissue motion. Since the velocity of this tissue or transducer motion is usually slow compared to the velocity of the blood flow being imaged, the operator can set the wall filter cutoff frequency high enough to filter out the tissue signal component. Filtering in this way, however, will also remove signals from low-velocity blood flow, which are often the signals desired to be imaged.

Some prior art systems provide a wall filter which can be manually adjusted to filter out a narrow band of frequencies in the echo signal centered on the carrier frequency where static signals lie. The bandwidth of this filter must be adjusted so that the signals reflected from the slow moving wall are eliminated without distorting the blood flow measurement. If the filter bandwidth is set too wide, signals from slowly moving blood may be eliminated. In addition, the filter setting is static and is applied over the whole image so that, within the field of view of the image, the filter may work adequately at some locations but not at others.

The processing approach described in Noujaim et al. U.S. Pat. No. 5,349,524 issued Sep. 20, 1994 and assigned to the instant assignee uses adaptive wall filtering whereby the wall signal is mixed down to zero frequency and then removed by using a real time domain filter to filter the I data and the Q data. This reduces the wall signal amplitude and allows the flow signal to be detected with greater accuracy, and at lower velocity than without this method. The adaptive wall filter automatically adjusts its bandwidth as a function of the received echo signal. A complex mixer receives the received echo signal and produces a modified echo signal which is shifted in frequency by an amount equal and opposite to the mean frequency of the received echo signal. The wall filter receives the modified echo signal and filters out a band of frequencies determined by the variance of the received echo signal. By automatically shifting the received echo signal frequency by an amount opposite to its measured mean frequency, the signal components therein resulting from slowly moving tissue are effectively shifted to the center of the filter. By automatically controlling the filter stop band width in dependence on the measured variance, signal components produced by slowly moving tissue are filtered out. The filter output signal is then conventionally processed to produce a color signal indicative of flow velocity.

SUMMARY OF THE INVENTION

The present invention relates to a time domain technique which implements an adaptive wall filter to improve imaging of low-velocity blood flow by removing from Doppler signals those signals associated with slowly moving scatterers. Adaptive wall filtering is performed on basebanded data using a complex time domain filter which distinguishes positive and negative frequencies.

The center frequency and bandwidth of the complex time domain wall filter are selected in accordance with estimates of wall parameters obtained using an autocorrelation technique or any other conventional technique for measuring a tissue motion parameter. In particular, an autocorrelation estimator can be used to estimate wall velocity and wall variance. The wall velocity estimate determines the wall signal center frequency; the wall variance estimate determines the wall signal bandwidth. The complex filter coefficients selected are those which will center the complex notch filter on the wall signal center frequency and set the cutoff frequencies (measured from this center frequency) to match the wall signal bandwidth.

An alternative implementation of the invention allows manual selection of the complex notch filter bandwidth, while the autocorrelation-estimated wall velocity determines the complex filter center frequency.

An object of the invention is to employ a time domain technique which implements an adaptive wall filter for imaging low velocity blood flow.

While the features of the invention believed to be novel are set forth in the appended claims, the invention itself, both as to organization and method of operation, together with further objects and advantages thereof, may best be understood by reference to the following description taken in conjunction with the accompanying drawings in which:

DETAILED DESCRIPTION OF THE PREFERRED EMBODIMENTS

Figure 1:
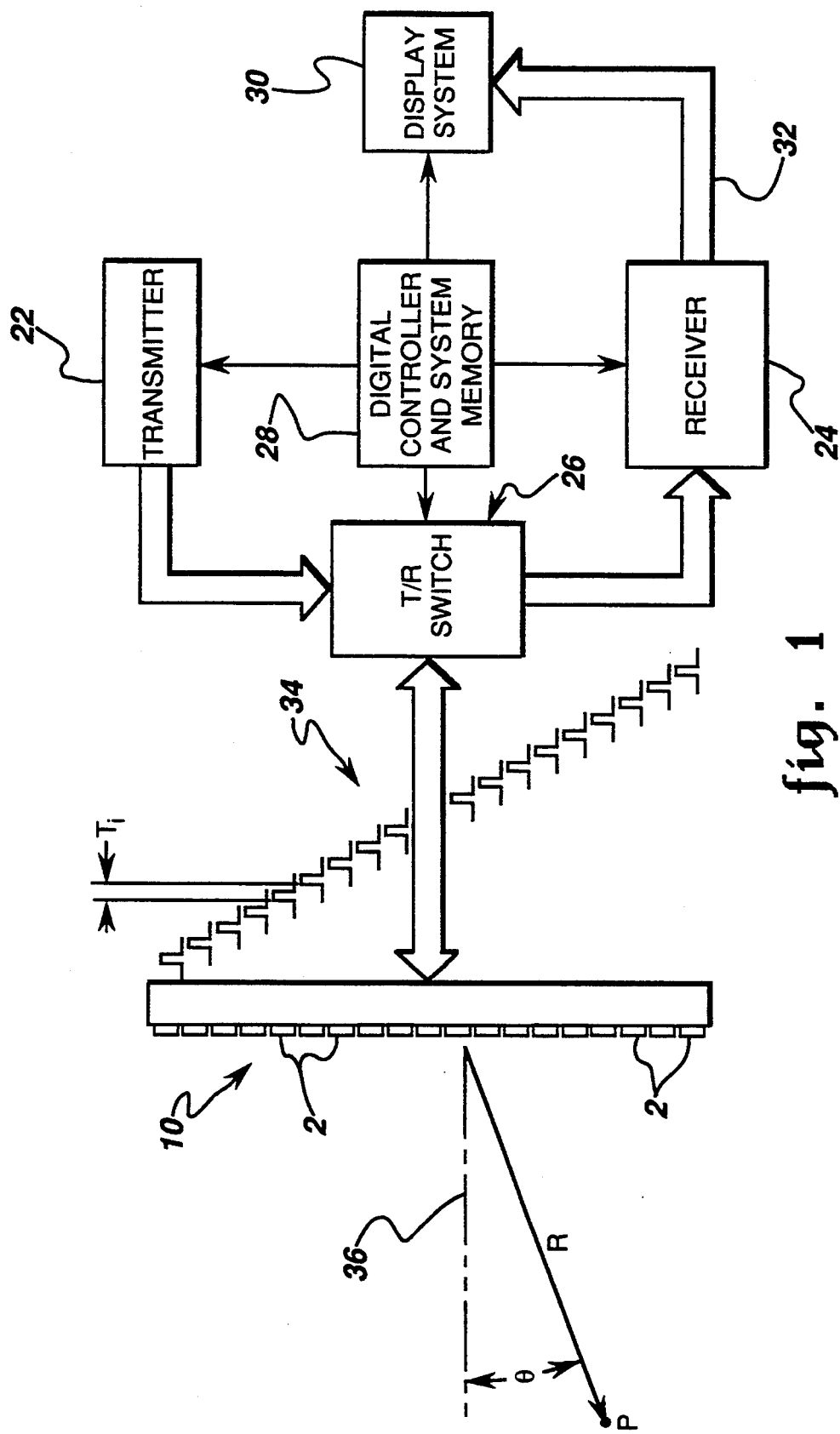
FIG. 1 is a block diagram of an ultrasonic imaging system which incorporates the present invention.

FIG. 1 illustrates a vibratory energy imaging system incorporating the invention as including a transducer array 10 comprised of a plurality of separately driven transducers 2, each of which produces a burst of ultrasonic energy when energized by a pulsed waveform from a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit positions, transmitter 22 is gated ON momentarily to energize each transducer 2, switches 26 are then set to their receive positions, and the subsequent echo signals produced by each transducer 2 are applied to receiver 24. The echo signals from all of transducers 2 are beamformed and combined in receiver 24 to produce a line in an image on a display system 30.

Transmitter 22 drives transducer array 10 such that the vibrational energy produced, e.g., ultrasonic energy, is directed, or steered, in a beam. To accomplish this, transmitter 22 imparts a time delay $T_i$ to the respective pulsed waveforms 34 that are applied to successive transducers 2. By adjusting time delays $T_i$ appropriately in conventional manner, the ultrasonic beam can be directed away from central axis 36 by an angle $\theta$ and/or focused at a fixed range R. A sector scan is performed by progressively changing time delays $T_i$ in successive excitations. The angle $\theta$ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the echo signal magnitude at a particular point in time represents the amount of reflection occurring at a specific range. Due to differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at angle $\theta$. Demodulation can occur either before or after the individual received signals are summed together.

Figure 2:
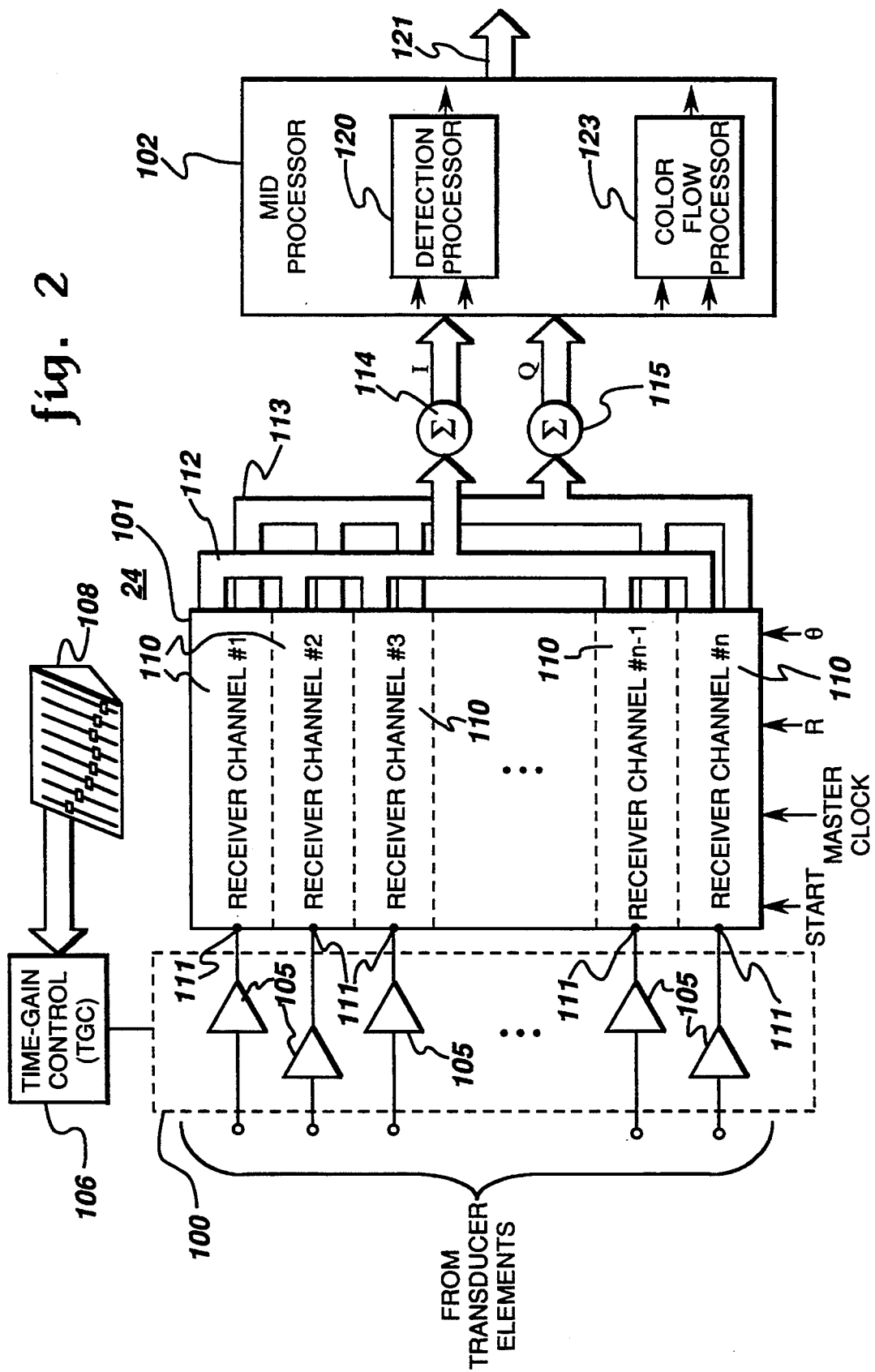
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the negatives of the transmission time delays when measured with respect to the time of impingement on the central transducer. The time delay of each receiver channel is continuously changing during reception of the echo to provide dynamic focusing of the received beam at range R from which the echo signal emanates.

Under direction of digital controller 28, receiver 24 provides delays during the scan such that steering of receiver 24 tracks the direction $\theta$ of the beam steered by transmitter 22, samples the echo signals at a succession of ranges R and provides the proper delays and phase shifts to dynamically focus at points P along the beam. Thus each emission of an ultrasonic pulse waveform results in acquisition of a series of data points which represent the amount of reflected sound from a corresponding series of points P located along the ultrasonic beam.

Display system 30 receives the series of data points produced by receiver 24 and converts the data into the desired image.

Receiver 24, as shown in FIG. 2, comprises a time-gain control section 100, a receive beamforming section 101 and a mid-processor 102. Time-gain control (TGC) section 100 includes a respective amplifier 105 for each of the receiver channels 110 and a time-gain control circuit 106. The input of each amplifier 105 is coupled to a respective one of transducers 2 to amplify the echo signal which it receives. The amount of amplification provided by amplifiers 105 is controlled through a control line 107 from TGC circuit 106, the latter being set by manual operation of potentiometers 108.

The receive beamforming section 101 of receiver 24 includes separate receiver channels 110. Each receiver channel 110 receives the analog echo signal from one of amplifiers 105 at an input 111 from which the amplified signal is conveyed to a pair of quadrature detectors in the respective receiver channel, where the phases of the mixing reference frequency differ by 90°. Since this reference frequency is made identical to that of the transmitted pulses, the output signals from the low-pass filter (shown in FIG. 3) in the receiver channel are complex signals (I and Q) with phases that differ by 90°. These signals are produced as a stream of digitized output values on an I bus 112 and a Q bus 113. Each of these I and Q baseband samples in time represents a demodulated sample of the echo signal envelope at a specific range R. These samples have been delayed such that when they are summed at summing points 114 and 115 with the I and Q samples from each of the other receiver channels 110, the summed signals indicate the magnitude and phase of the echo signal reflected from a point P located at range R on the steered beam. Alternatively, the demodulation can be performed after the individual received signals are summed.

Midprocessor section 102 receives the beam samples from summing points 114 and 115. The I and Q values of each beam sample are signals representing the in-phase and quadrature components of the magnitude of sound reflected from a point (R, θ). A color flow processor 123 receives the I and Q values of each demodulated and focused echo signal sample from summing points 114 and 115 over multiple firings, and produces a flow value at the midprocessor output 121. This flow signal controls the red, green and blue display colors, and is applied to display system 30 (see FIG. 1) along with the magnitude M for the same point. The color indicated by this flow value is a function of the velocity and direction of flow, and possibly the flow variance or power, as measured by color flow processor 123.

Figure 3:
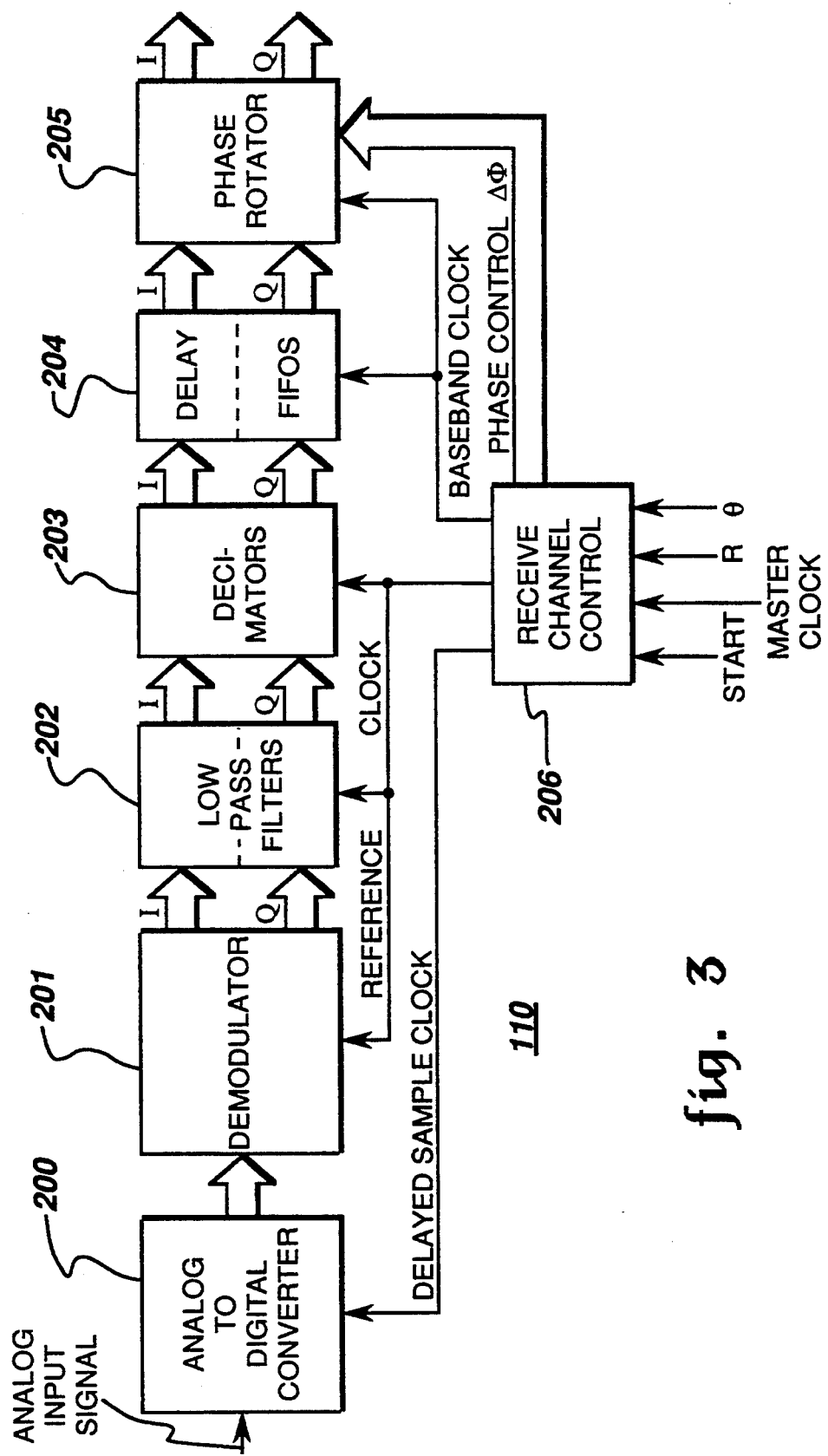
FIG. 3 is a block diagram of a receiver channel which forms part of the receiver of FIG. 2.

As shown in FIG. 3, each receiver channel is responsive to a START command, a master clock, and a beam angle signal (θ) from digital controller 28 (FIG. 1) to perform the digital beamforming functions, which include: sampling the analog input signal in an analog-to-digital converter 200; demodulating the sampled signal in a demodulator 201; filtering out the high-frequency sum signals produced by demodulator 201 with low pass filters 202; reducing the data rate in decimators 203; time delaying and, if necessary, phase adjusting the resulting digital data stream in delay FIFO (i.e., first-in/first-out) memories 204 and phase rotator 205. Elements 200-205 are controlled by a receive channel control 206 which produces the required clock and control signals in response to commands from digital controller 28 (FIG. 1).

Analog-to-digital converter 200 samples the analog signal at regular intervals. These samples are provided to demodulator 201, which mixes each sample with both a reference that is in-phase with the transmitted ultrasonic carrier and a reference that is in quadrature with the transmitted ultrasonic carrier. Low pass filters 202 are finite impulse response (FIR) filters tuned to pass the difference frequencies supplied by demodulator 201 but block the higher, sum frequencies. The output signal of each low pass filter is a stream of digital values which indicate the magnitude of the I or Q component of the echo signal envelope.

The rate at which the demodulated I and Q components of the echo signal are sampled is reduced by decimators 203. The echo signal envelope represented by the demodulated and decimated digital samples is then delayed by delay FIFOs 204 and, if necessary, phase shifted by phase rotator 205 to provide the desired beam steering and beam focusing.

Color flow processor 123, as shown in FIG. 2, is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

Figure 4:
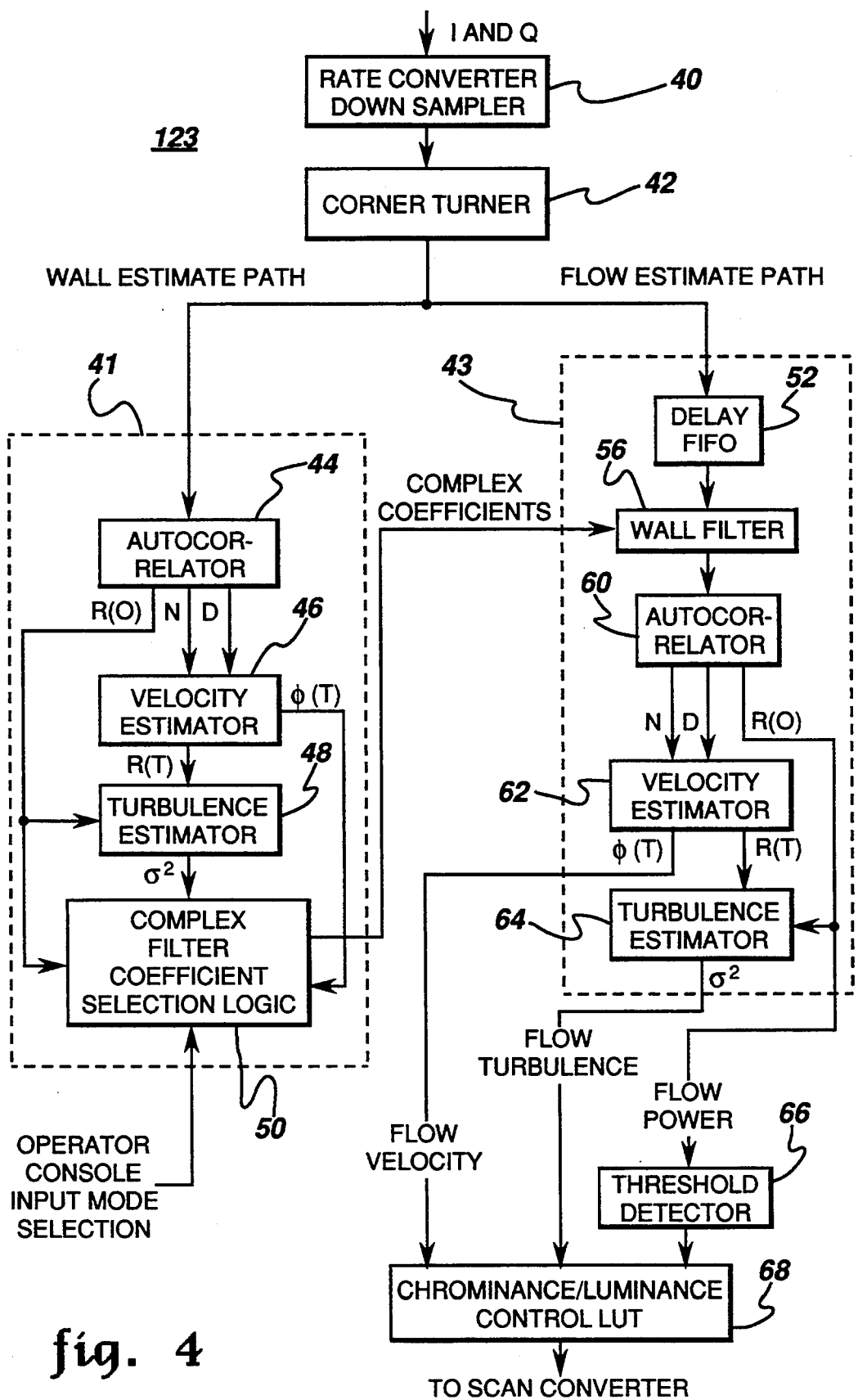
FIG. 4 is a schematic diagram of a color flow processor having a complex filter in accordance with a preferred embodiment of the invention.

Color flow processor 123, as shown in FIG. 4, receives the summed complex I/Q data from the beamformer and processes it to calculate flow velocity, turbulence, and power for all sample volumes within an operator-defined region. Color flow processor 123 employs a rate converter down sampler 40 to down-sample the incoming data such that the resulting number of data points is consistent with the output display resolution. The downsampled data are stored in a corner turner 42, which buffers data from possibly interleaved firings and supplies the data as vectors of points across firings at a given range cell.

The color flow processor has adaptive and nonadaptive modes. The adaptive mode is employed to suppress tissue motion, and uses both the wall estimate path 41 and flow estimate path 43. In the adaptive mode the filter coefficients are selected so that wall filter 56 acts as a complex notch filter. The nonadaptive mode uses only the flow estimate path. In the nonadaptive mode the filter coefficients are selected manually so that wall filter 56 acts as a real notch filter. The adaptive mode provides an estimate of the wall velocity and wall variance, which allows the system to adaptively vary the complex wall filter to match the wall signal characteristics. The wall estimate path includes an autocorrelator 44, a velocity estimator 46 and a turbulence (variance) estimator 48, while the flow estimate path includes an autocorrelator 60, a velocity estimator 62 and a turbulence (variance) estimator 64.

Adaptive wall filtering is performed on the basebanded data using, as a wall filter, a complex time domain filter 56. Filter 56 distinguishes positive and negative frequencies. The center frequency and bandwidth of the complex time domain wall filter are selected in dependence on estimates of wall parameters obtained using a conventional autocorrelation technique. For example, autocorrelator 44, velocity estimator 46 and turbulence estimator 48 can be used to estimate the wall power $R(0)$, wall velocity $\phi(T)$ and wall variance $\sigma^2$, respectively. The wall velocity estimate determines the center frequency of the wall signal, while the wall variance estimate determines the bandwidth of the wall signal. The wall power estimate determines whether the complex filter will be enabled. These estimates are furnished to complex filter coefficient selection logic 50, which preferably takes the form of a look-up table. The complex filter coefficients selected by selection logic 50 are those which will center the complex notch filter on the wall center frequency, and which will set the cutoff frequencies (measured from this center frequency) to match the bandwidth of the wall signal. Subsequent complex filter coefficients are dynamically adapted using the wall variance estimate. If the estimated wall power is less than a predetermined threshold, filter coefficients will be selected so that wall filter 56 acts as a real filter for removing DC and very low frequencies, not a complex filter.

If the quadrature input time-dependent Doppler signals I and Q are treated as a complex time-dependent value W as follows:

$$W(t) = I(t) + jQ(t) \tag{1}$$

then a complex filter is one where the complex filter coefficients $C_n$ are used to form a filter with output $Z(t)$:

$$Z(t) = \sum_n C_n W(t - n). \quad (2)$$

This is a complex finite impulse response (FIR) filter. It is also possible to use a complex infinite impulse response (IIR) filter to perform the filtering operations required for the present invention.

Figure 5A:
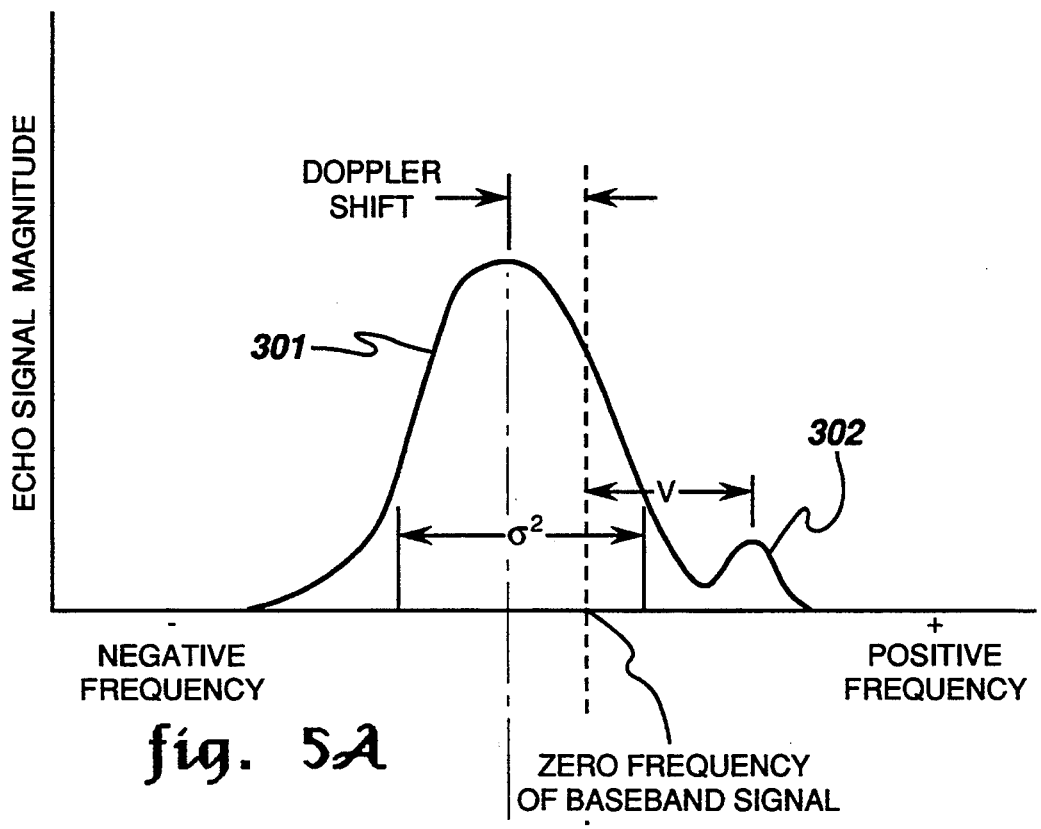
FIG. 5A is a graphic illustration of echo signal magnitude versus frequency.

As shown in FIG. 5A, the echo signal may include a wall signal component 301 shifted in frequency in one direction from the carrier due to the Doppler effect caused by wall motion. The echo signal also includes a much smaller flow signal component 302 which has been frequency shifted by the Doppler effect in the other direction.

Figure 5B:
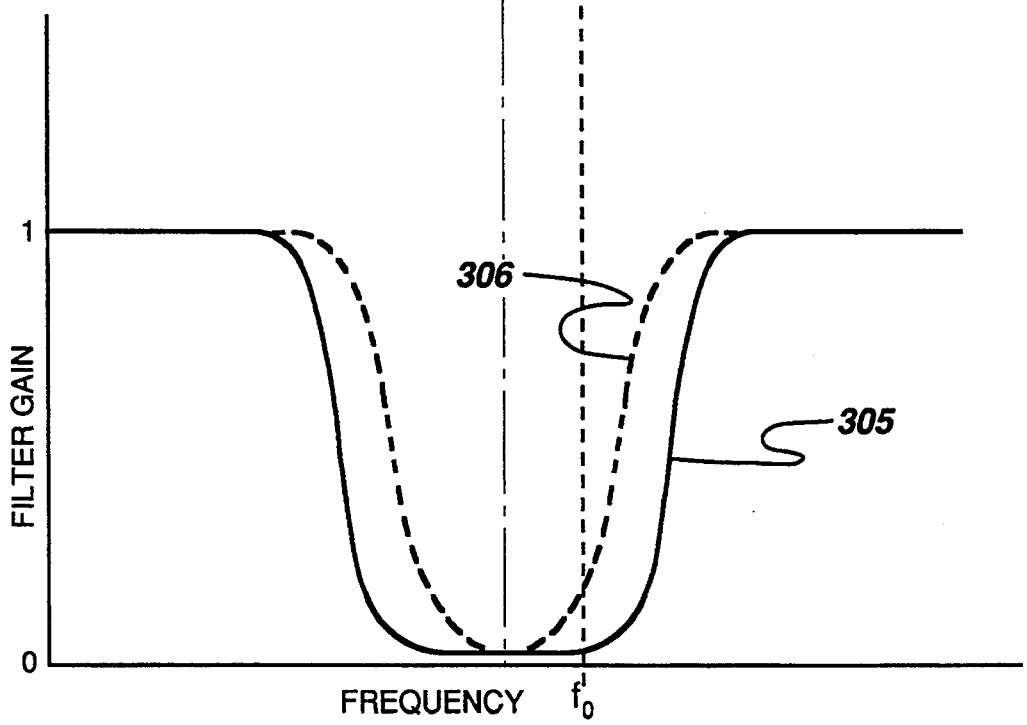
FIG. 5B is a graphic illustration of the adaptive wall filter characteristic in accordance with the invention.

As shown in FIG. 4, the I and Q values for the received echo signal are applied to the inputs of complex wall filter 56, which has a stop band that is not centered at DC and has a filter characteristic 305 shown in FIG. 5B. The width of this stop band is determined by the filter coefficients which are supplied by complex filter coefficient selection logic 50. For example, another set of applied filter coefficients may produce a filter characteristic 306, as shown in FIG. 5B, with a narrower stop band than that of filter characteristic 305. This feature facilitates control of the width of the FIR filter stop band such that it matches the bandwidth of the wall signal component.

The autocorrelation algorithm is used to estimate the mean Doppler shift and variance directly. The real and complex autocorrelation between data from the adjacent firings is calculated and summed. These values, N and D respectively, are determined as follows:

$$N = \sum_{i=1}^{M-1} (I_i Q_{i+1} - I_{i+1} Q_i) \quad (3)$$

$$D = \sum_{i=1}^{M-1} (I_i I_{i+1} + Q_i Q_{i+1}) \quad (4)$$

where $I_i$ and $Q_i$ are the demodulated, basebanded input data for firing i, and M is the number of firings in the packet. The mean Doppler frequency in hertz $f$ is obtained from the phase of N and D and the pulse repetition interval T:

$$f = \frac{1}{2\pi T} \tan^{-1}\left[\frac{N}{D}\right]. \quad (5)$$

The mean velocity $\bar{v}$ is calculated using the well-known Doppler equation:

$$v = \frac{f}{f_0} \frac{c}{2\cos\gamma} \quad (6)$$

where c is the speed of sound in the transmission medium, $f_0$ is the transmitted frequency and $\gamma$ is the angle between the direction of blood flow and the direction of the ultrasound beam. A time domain expression for turbulence can be written as a second-order series expansion of the variance $\sigma^2$ of the mean Doppler frequency. The time domain representation involves calculating the zero- and one-lag autocorrelation functions, R(0) and R(T) respectively. Thus, $$\sigma^2 = \frac{2}{(2\pi T)^2}\left[1 - \frac{|R(T)|}{R(0)}\right]. \quad (7)$$

The exact autocorrelation functions are approximated by finite sums over the known data in the number of firings in a packet:

$$|R(T)| = \sqrt{N^2 + D^2} \quad (8)$$

$$R(0) = \sum_{i=1}^{M-1} \frac{(I_i^2 + Q_i^2 + I_{i+1}^2 + Q_{i+1}^2)}{2}. \quad (9)$$

This algorithm is implemented in the hardware and is the basis for the color flow processing. The calculated values for N and D are supplied by autocorrelator 60 to flow velocity estimator 62. Flow velocity estimator 62 computes R(T) and $\phi(T)$ in accordance with Eqs. (6), (7) and (9). The mean value signal $\phi(T)$ is an estimate of the mean Doppler frequency shift of the flowing reflectors, which in turn is proportional to the mean blood flow velocity. Functions R(0) from autocorrelator 60 and R(T) from velocity estimator 62 are supplied to turbulence estimator 64, which computes the variance $\sigma^2$ in accordance with Eq. (8). R(0) is also supplied to a power threshold detector 66, from which power signals in excess of a predetermined threshold are supplied to a chrominance/luminance control look-up table memory 68 which resides in display system 30 (FIG. 1). The output signal of look-up table memory 68 is supplied to a scan converter (not shown) which converts flow signals supplied thereto to a form for producing the desired image.

As shown in FIG. 5A, the variance $\sigma^2$ is an indication of the width of the wall signal components. The variance $\sigma^2$ can be used to select complex wall filter coefficients from a look-up table which match the stop band of complex wall filter 56 to the bandwidth of the applied echo signal. As a result, the output signal of complex wall filter 56 is a filtered echo signal primarily comprising the flow signal components 302 shown in FIG. 5A.

The autocorrelator/velocity estimator circuits 44/46 and 60/62 may be constructed, for example, from a complex conjugate multiplier, a pair of delays and a pair of integrators as described by Kasai et al., IEEE Trans. Sonics & Ultrasonics, Vol. SU-32, No. 3, May 1985, pp. 458–464, *Real-Time Two-Dimensional Blood Flow Imaging Using Autocorrelation Technique*, which is incorporated herein by reference.

The output signal $\phi(T)$ forms the flow velocity component of the flow signal produced by color flow processor 123 and is applied to the least significant digital address inputs on chrominance/luminance control look-up table (LUT) 68 which resides in display system 30 (FIG. 1). Each addressable memory in the chrominance/luminance control LUT stores 24 bits of data which are read out on a bus. For each pixel in the colored image to be produced, eight of these of these bits control intensity of red, another eight bits control intensity of green, and the remaining eight bits control intensity of blue. These bit patterns are preselected such that as flow velocity changes in direction or magnitude, color of the pixel at location (R, $\theta$) is changed. For example, flow toward the transducer may be indicated as red and flow away from the transducer may be indicated as blue. The faster the flow, the brighter the color.

To indicate the nature of the flowing reflectors, turbulence estimator 64 produces the variance signal $\sigma^2$ which indicates frequency spread of the flow signal component of the baseband echo signal. This value is representative of flow turbulence, since laminar flow has a very narrow range of velocities, while turbulent flow is a mixture of many velocities. The turbulence value is supplied from color flow processor 123 as another component of the flow signal on bus 121 (FIG. 2), and is applied to the most significant digit address terminals on chrominance/luminance control LUT 68 of display system 30 (FIG. 2). The turbulence value $\sigma^2$ completes the address from which chrominance control data will be read out of chrominance/luminance control LUT 68.

To indicate strength of the signal from the flowing reflectors, autocorrelator 60 produces signal R(0) which indicates the amount of returned power in the Doppler-shifted flow signal. Signal R(0), when at an amplitude in excess of the threshold value determined by threshold detector 66, may be supplied to the intermediate digit address terminals of chrominance/luminance control LUT 68. This allows a visual display of flow signal strength to be distinguished by color, brightness or other visual means as selected by values loaded into various address locations of the chrominance/luminance control LUT.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A processor for color flow imaging of velocity of scatterers flowing past moving tissue, comprising:
a source of basebanded signals;
a first velocity estimator for estimating velocity of said tissue based on said basebanded signals;
selection logic means for selecting complex filter coefficients in dependence on at least said estimated tissue velocity;
delay means coupled to receive said basebanded signals;
a complex filter coupled to receive delayed basebanded signals from said delay means and to receive signals representing complex filter coefficients from said selection logic means; and
a second velocity estimator for estimating flow velocity of said scatterers based on said filtered basebanded signals.

2. The color flow processor as defined in claim 1, wherein said complex filter coefficients are selected to center said complex filter on a frequency corresponding to said estimated tissue velocity.

3. The color flow processor as defined in claim 1, further comprising a first turbulence estimator for estimating variance of said tissue velocity.

4. The color flow processor as defined in claim 3, wherein said selection logic means is coupled to receive a signal representing said estimated tissue velocity variance from said first turbulence estimator, whereby said selection logic means can select said complex filter coefficients in dependence on said estimated tissue velocity variance.

5. The color flow processor as defined in claim 3, further comprising a second turbulence estimator for estimating flow velocity variance of said scatterers.

6. The color flow processor as defined in claim 5, further comprising a color display system and means for controlling color displayed by each pixel of said display system in accordance with at least said estimated flow velocity.

7. The color flow processor as defined in claim 5, further comprising a color display system and means for controlling color displayed by each pixel of said display system in accordance with at least said estimated flow velocity variance.

8. A method for color flow imaging of velocity of scatterers flowing past moving tissue, comprising the steps of:
acquiring basebanded data;
estimating velocity of said tissue from said basebanded data;
selecting complex filter coefficients in dependence on at least said estimated tissue velocity;
delaying said basebanded data;
filtering said delayed basebanded signals in accordance with said selected complex filter coefficients; and
estimating flow velocity of said scatterers from the filtered basebanded data.

9. The method as defined in claim 8, wherein said complex filter coefficients are selected to center said delayed basebanded signals on a frequency corresponding to said estimated tissue velocity.

10. The method as defined in claim 8, further comprising the step of estimating variance of said tissue velocity.

11. The method as defined in claim 10, wherein said complex filter coefficients are selected in accordance with said estimated tissue velocity variance.

12. The method as defined in claim 11, wherein said complex filter coefficients are selected to set complex filter cutoff frequencies to match a bandwidth corresponding to said estimated tissue velocity variance.

13. The method as defined in claim 10, further comprising the step of estimating flow velocity variance of said scatterers.

14. The method as defined in claim 13, further comprising the step of controlling color displayed by each pixel of a display device in accordance with at least said estimated flow velocity.

15. The method as defined in claim 13, further comprising the step of controlling color displayed by each pixel of a display device in accordance with at least said estimated flow velocity variance.

16. A color flow imaging system for imaging velocity of scatterers flowing past moving tissue, comprising:
a plurality of transducers arranged in a sequence to form an array;
means for selectively operating said transducers in a transmission mode to produce propagating vibratory energy pulses from electrical driving signals;
means for selectively operating said transducers in a reception mode to produce analog electrical detection signals in response to detection of reflected vibratory energy pulses;
means responsive to said analog electrical detection signals for converting said analog electrical detection signals into basebanded signals;
first velocity estimation means for estimating velocity of said tissue based on said basebanded signals;

selection logic means for selecting complex filter coefficients in dependence on at least said estimated tissue velocity;

delay means coupled to receive said basebanded signals from said supplying means;

filter means coupled to receive delayed basebanded signals from said delay means and to receive signals representing complex filter coefficients from said selection logic means;

correlation means coupled to receive filtered basebanded signals from said filter means; and second velocity estimation means for estimating flow velocity of said scatterers based on said filtered basebanded signals.

17. The color flow imaging system as defined in claim 16, further comprising first turbulence estimation means for estimating variance of said tissue velocity, wherein said selection logic means is coupled to receive a signal representing said estimated tissue velocity variance from said first turbulence estimation means, said selection logic means being adapted to select said complex filter coefficients in dependence on said estimated tissue velocity variance.

18. The color flow imaging system as defined in claim 17, further comprising second turbulence estimation means for estimating said flow velocity variance of said scatterers.

19. The color flow imaging system as defined in claim 18, further comprising:

color display means having a multiplicity of pixels; and means for controlling color displayed by each pixel in accordance with at least said estimated flow velocity.

20. The color flow imaging system as defined in claim 18, further comprising:

color display means having a multiplicity of pixels; and means for controlling color displayed by each pixel in accordance with at least said estimated flow velocity variance.

21. The color flow imaging system as defined in claim 16 wherein said means responsive to said analog electrical detection signals for converting said analog electrical detection signals into basebanded signals comprises:

means for converting said analog electrical detection signals into digital samples; and means for basebanding said digital samples to form basebanded signals.

22. The color flow imaging system as defined in claim 21, further comprising first turbulence estimation means for estimating variance of said tissue velocity, wherein said selection logic means is coupled to receive a signal representing said estimated tissue velocity variance from said first turbulence estimation means, said selection logic means being adapted to select said complex filter coefficients in dependence on said estimated tissue velocity variance.

23. The color flow imaging system as defined in claim 22, further comprising second turbulence estimation means for estimating said flow velocity variance of said scatterers.

* * * * *